US008580701B2

(12) United States Patent
Adib et al.

(10) Patent No.: US 8,580,701 B2
(45) Date of Patent: Nov. 12, 2013

(54) METHOD OF CONTROLLING CE:ZR RATIO IN OXIDE NANOPARTICLES

(75) Inventors: Kaveh Adib, Corning, NY (US); Steven Bolaji Ogunwumi, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 158 days.

(21) Appl. No.: 12/950,443

(22) Filed: Nov. 19, 2010

(65) Prior Publication Data

US 2012/0129681 A1 May 24, 2012

(51) Int. Cl.
*B01J 37/34* (2006.01)
*B01J 23/00* (2006.01)
*B01J 23/10* (2006.01)

(52) U.S. Cl.
USPC ............... 502/5; 502/300; 502/302; 502/303; 502/304; 502/308; 502/349; 977/775

(58) Field of Classification Search
USPC ..................... 502/5, 300, 302–304, 308, 349; 977/775
See application file for complete search history.

(56) References Cited

U.S. PATENT DOCUMENTS

| 4,837,233 | A | * | 6/1989 | Glaeser et al. | 502/204 |
| 6,040,265 | A | * | 3/2000 | Nunan | 502/242 |
| 6,150,288 | A | * | 11/2000 | Suzuki et al. | 501/105 |
| 6,306,794 | B1 | * | 10/2001 | Suzuki et al. | 502/304 |
| 6,326,329 | B1 | * | 12/2001 | Nunan | 502/242 |
| 6,528,451 | B2 | * | 3/2003 | Brezny et al. | 502/304 |
| 6,569,392 | B1 | * | 5/2003 | Li et al. | 423/213.5 |
| 6,797,668 | B2 | * | 9/2004 | Yoshikawa | 502/304 |
| 6,852,665 | B2 | * | 2/2005 | Morikawa et al. | 502/302 |
| 7,030,055 | B2 |   | 4/2006 | Yaluris et al. | 502/326 |
| 7,052,777 | B2 | * | 5/2006 | Brotzman et al. | 428/570 |
| 7,169,196 | B2 | * | 1/2007 | Wakefield | 44/354 |
| 7,431,910 | B2 |   | 10/2008 | Takao et al. | 423/594 |
| 7,481,983 | B2 |   | 1/2009 | Patchett et al. | 422/180 |
| 7,851,405 | B2 | * | 12/2010 | Wakamatsu et al. | 502/332 |
| 8,048,389 | B2 | * | 11/2011 | Okamoto et al. | 423/21.1 |
| 8,097,553 | B2 | * | 1/2012 | Miura et al. | 502/304 |
| 8,133,836 | B2 | * | 3/2012 | Beppu et al. | 502/202 |

(Continued)

FOREIGN PATENT DOCUMENTS

| EP | 1 415 956 | 8/2007 |
| WO | 2005/102524 | 11/2005 |
| WO | 2008/150462 | 12/2008 |
| WO | 2009/001131 | 12/2008 |

OTHER PUBLICATIONS

Mimani, T., et al., "Solution Combustion Synthesis of Nanoscale Oxides and Their Composites", Mater. Phys. Mech. 4, 2001, p. 134-137.

(Continued)

*Primary Examiner* — Cam N. Nguyen
(74) *Attorney, Agent, or Firm* — John L. Haack (57) ABSTRACT

A method of making a nanoparticle catalyst composition including: a single heating of an aqueous salt solution comprising a Ce, a Zr, a rare earth dopant, and a transition metal oxide precursor to provide nanoparticles, the nanoparticles have a compositional gradient comprised of a $CeZrREO_2$, where RE is a rare earth, and the outer portion of the nanoparticles has a Ce:Zr ratio different from the inner portion of the nanoparticles. Also disclosed is a nanoparticle-catalyst composition and articles containing the composition, as defined herein.

16 Claims, 7 Drawing Sheets

(56) References Cited

U.S. PATENT DOCUMENTS

| | | | |
|---|---|---|---|
| 8,187,548 B2* | 5/2012 | Yamada et al. | 422/177 |
| 2007/0014710 A1* | 1/2007 | Gerlach et al. | 423/213.5 |
| 2007/0104629 A1* | 5/2007 | Yadav | 423/21.1 |
| 2007/0141370 A1* | 6/2007 | Kerber | 428/469 |
| 2007/0212542 A1* | 9/2007 | Guo et al. | 428/406 |
| 2007/0274889 A1 | 11/2007 | Nakatsuji et al. | 423/213.2 |
| 2008/0009410 A1* | 1/2008 | Okamoto et al. | 502/304 |
| 2008/0051283 A1 | 2/2008 | Miura | 502/304 |
| 2008/0072581 A1* | 3/2008 | Iizuka et al. | 60/301 |
| 2008/0138267 A1* | 6/2008 | Yadav | 423/263 |
| 2008/0164141 A1* | 7/2008 | El-Shall et al. | 204/157.21 |
| 2009/0099012 A1* | 4/2009 | Suzuki et al. | 502/303 |
| 2009/0105070 A1* | 4/2009 | Tanabe et al. | 502/303 |
| 2009/0139382 A1* | 6/2009 | Clack | 83/471.3 |
| 2009/0209416 A1* | 8/2009 | Sato et al. | 502/304 |
| 2009/0215614 A1* | 8/2009 | Chane-Ching | 502/304 |
| 2009/0220698 A1* | 9/2009 | Yadav | 427/383.5 |
| 2009/0272943 A1* | 11/2009 | Chartier et al. | 252/373 |
| 2009/0297418 A1* | 12/2009 | Liu | 423/239.1 |
| 2009/0302275 A1* | 12/2009 | Chartier et al. | 252/373 |
| 2010/0092841 A1* | 4/2010 | Lopez et al. | 429/44 |
| 2010/0222205 A1* | 9/2010 | Ogunwumi et al. | 502/68 |
| 2010/0242342 A1* | 9/2010 | Reed et al. | 44/354 |
| 2010/0247411 A1 | 9/2010 | Larcher et al. | 423/239.1 |
| 2010/0303712 A1* | 12/2010 | Nagaoka et al. | 423/651 |
| 2011/0152072 A1* | 6/2011 | Miura | 502/304 |
| 2011/0311635 A1* | 12/2011 | Stucky et al. | 424/490 |
| 2012/0124899 A1* | 5/2012 | Difrancesco et al. | 44/457 |

OTHER PUBLICATIONS

Satsuma, A., et al., "Tungstated-Zirconia Thick Film Electrode as Ammonia Sensor for Urea-SCR", The 14th International Congress on Catalysis, 2 pages.

* cited by examiner

Fig. 1A

[PRIOR ART]

METHOD OF CONTROLLING CE:ZR RATIO IN OXIDE NANOPARTICLES

The entire disclosure of any publication or patent document mentioned herein is incorporated by reference.

FIELD

The disclosure relates generally to catalysts and methods of making the catalysts, for example, NOx reduction catalysts, for use in, for example, honeycomb bodies, such as for engine exhaust systems.

BACKGROUND

Various methods and devices are known for reducing emissions of engine exhaust, including catalyst supports, or substrates, and filters.

SUMMARY

The disclosure relates to methods for preparing mixed metal oxide nanoparticles, to compositions and articles containing the nanoparticles, and to methods of controlling metal-metal ratio within the mixed metal oxide nanoparticles.

BRIEF DESCRIPTION OF THE DRAWINGS

In embodiments of the disclosure.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

DEFINITIONS

"Super additive," "super addition," and like terms generally refer to adding additional ingredients or materials to a batch composition or like formulation in excess of, or in addition to, a 100 wt % base inorganics formulation. A base formulation totaling 100 wt % can be, for example, a combination of nano-zeolite in an amount from 20 to 70 weight percent and an inorganic filler material in an amount from 80 to 30 weight percent, and the super additives can be a mixture of pore formers, with or without other super additives, and can be present or added to the batch in, for example, from about 50 to about 300 wt % in addition to the base formulation 100 wt %. In embodiments, the disclosed nanoparticulate catalyst compositions can be used as an additive or super additive in, for example, a catalyst filter body and like articles and applications.

Extruded Catalyst Filter (ECF) body refers to a filter body having a catalyst, that is pre-loaded, that can be prepared with or without having a wash coat treatment.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example: through typical measuring and handling procedures used for making compositions, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Consisting essentially of" in embodiments refers, for example, to a catalytic honeycomb filter article having relatively high porosity and increased strength, to a method of making a catalytic filter article and precursors thereto, devices incorporating the catalytic filter article, and can include the components or steps listed in the claim, plus other components or steps that do not materially affect the basic and novel properties of the compositions, articles, apparatus, or methods of making and use of the disclosure, such as particular reactants, particular additives or ingredients, a particular agents, a particular surface modifier or condition, or like structure, material, or process variable selected. Items that may materially affect the basic properties of the components or steps of the disclosure or that may impart undesirable characteristics to the present disclosure include, for example, a nanoparticle having a uniform mixed metal oxide composition, a nanoparticle having a discrete core-shell structure, that are beyond the values, including intermediate values and ranges, defined and specified herein.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, and like aspects, and ranges thereof, are for illustration only; they do not exclude other defined values or other values within defined ranges. The compositions, apparatus, and methods of the disclosure can include any value or any combination of the values, specific values, more specific values, and preferred values described herein.

The disclosed catalysts and methods of making are achieved by, for example, selecting different rare earth metal additives to control the ratio of Ce to Zr in the top or outer surface of a nanoparticle comprising $CeO_2$—$ZrO_2$ and transition metal oxide as compared to its bulk, to create a gradient composition structure. The gradient composition catalyst nanoparticles of the disclosure can be formed using modified techniques based on known solution combustion methods (see T. Mimani, et al., "Solution Combustion Synthesis of Nanoscale Oxides and Their Composites," *Mater. Phys. Mech.*, 4 (2001) 134-137). Integrating the NOx reduction catalyst into a support can include, for example, washcoating the catalyst onto a support, or extruding the catalyst in a green ware then firing the ware.

Currently, much of the NOx reduction technology using metal oxide and transition metal oxides rely on the use of $TiO_2$ and $V_2O_5$ or $CeO_2$—$ZrO_2$ and $WO_3$. The former is being phased out due to health hazard concerns while the latter uses a composite of $CeO_2$ and $ZrO_2$ at different ratios. The ratio of the $CeO_2$ to $ZrO_2$ plays an important role in the performance of the catalyst body at different temperatures. It is of interest to be able to control the ratio.

It is common practice to add different dopants (for example, trivalent rare earth elements) to $CeO_2$ or $CeO_2$—$ZrO_2$ compositions to enhance ionic conductivity or phase stability. However, there is believed to be no instance of systematically using rare-earths to control the cerium:zirconium ratio in a core-shell structure because prior synthesis techniques do not allow for such structures through the direct addition of dopants. A previous study showed that nanoparticles of $CeO_2$—$ZrO_2$ containing different ratios of Ce:Zr will have different ammonia adsorption/desorption kinetics. However, dopants were not used in this instance to achieve different Ce:Zr ratios in the nanoparticles (J. I. Gutiérrez-Ortiz, et al., "Characterization of the catalytic properties of the ceria-zirconia mixed oxides by temperature programmed techniques," *Journal of Thermal Analysis and calorimetry*, Vol. 80 (2005) 225-228). Another study used rare earth dopants to control the ionic conductivity of high surface area $CeO_2$ particles, however, $ZrO_2$ or $WO_3$ was not used and the application did not involve NOx reduction catalysts (S. Zhao, et al., "The effect of oxide dopants in ceria on n-butane oxidation", *Applied Catalysis A: General* 248 (2003) 9-18).

Still another study used rare earth dopants to modify the alumina used as a support for the $CeO_2$—$ZrO_2$ catalyst (M. I. Ozawa, "Thermal stabilization of catalytic compositions for automobile exhaust treatment through rare earth modification of alumina nanoparticle support" *Journal of Alloys and Compounds* 408-412 (2006) 1090-1095). However, in this instance the rare earths were used only to modify the alumina support and not used to modify the $CeO_2$—$ZrO_2$ ratio to produce a core-shell structure.

Still other studies of cerium oxide, with and without an additive, and a transition metal (such as $WO_3$) were used for other than NOx reduction catalysts. For example, $WO_3$—$CeO_2$ catalysts have been reported for use in reforming applications (C. Bigey, et al., "$WO_3$—$CeO_2$ and $Pd/WO_3$—$CeO_2$ as potential catalysts for reforming applications", *Journal of Catalysis*, 198 (2001) 208-222), as catalysts in SOFC (Solid Oxide Fuel Cell) applications (M. M. Natile, et al., "$WO_3$/$CeO_2$ nanocomposite powders; synthesis, characterization, and reactivity", *Chem. Mater.* 18 (2006) 3270-3280), and as catalysts for wet peroxide oxidation of phenolic solutions (P. Massa, et al., "Catalytic wet peroxide oxidation of phenolic solutions over $Fe_2O_3/CeO_2$ and $WO_3/CeO_2$ catalyst systems", *Catalysis Communications*, 9 (2008) 1533-1538).

Other studies have examined cerium oxide and a transition metal oxide in conjunction with another oxide (such as $ZrO_2$) for NOx reduction applications. For example, a previous study mentions the use of ceria as a dopant to $TiO_2$ and $Fe_2O_3$ pillared clays (2-dimensional zeolite-like materials) where the strong promoting effects of ceria were noted. However, no use of rare-earth dopants has been reported (R. T. Yang, et al., "Pillared clays as superior catalysts for selective catalytic reduction of NO with $NH_3$", *Ind. Eng. Chem. Res.*, 31 (1992) 1440). There is at least one report of a $CeO_2$—$ZrO_2$ composite and a transition metal oxide used for NOx reduction (Y. Li, et al., "$WO_3/CeO_2$—$ZrO_2$, a promising catalyst for selective catalytic reduction (SCR) of NOx with $NH_3$ in diesel exhaust," *Chem. Comm.* (2008)1470-1472).

Other references mention the use of $WO_3$ and $CeO_2$ in conjunction with another material to impart structural properties (e.g., alumina as a substrate) or functional properties (e.g., zirconia) in the reduction of NOx. Some of these references are mentioned further below.

U.S. Pat. No. 7,030,055, discloses manufacture of a rare earth metal oxide (such as ceria) and a transition metal oxide (such as $WO_3$) by adding precursors of each to a solution or mixture of an acidic oxide, such as alumina, silica alumina, lanthana alumina, and zirconia alumina, and processed, to produce the rare earth metal oxide-transition metal oxide catalyst body supported on the acidic oxide body.

US Patent Publication 20070274889A1 discloses a catalyst body comprised of an outer catalyst layer and an inner catalyst layer. The outer catalyst layer consists of a rare earth metal oxide (such as ceria or praseodymium oxide) and a transition metal oxide (such as tungsten oxide). The inner layer consists of a noble metal catalyst component (such as platinum).

U.S. Pat. No. 7,481,983, discloses a zone coated catalyst comprised of a NOx reduction catalyst consisting of $V_2O_5$, $WO_3$, and $TiO_2$, and an unreacted ammonia destruction catalyst consisting of ceria.

WO2009001131 A1 discloses a non-zeolite, base metal, selective catalytic reduction catalyst consisting of at least one transition metal (such as $WO_3$) dispersed on a mixed oxide and zirconium oxide as single oxides or a composite oxide thereof, or a mixture of the single oxides and the composite oxide dispersed on an inert oxide support material, whereon is dispersed at least one transition metal, such as chromium, cerium, manganese, iron, cobalt, nickel, tungsten, or copper.

WO2008150462 A2 discloses a NOx reduction catalyst including a catalyst for the selective catalytic reduction of a nitrogen oxide, comprising a first component selected from oxides of a transition metal other than the metal contained in the second component, or a mixture or combination thereof, a second component selected from cerium oxides, cerium-zirconium composite oxides, cerium-titanium composite oxides, and combinations thereof.

EP1415956(B1) discloses an exhaust purification catalyst consisting of $CeO_2$ and $ZrO_2$, with and without other metal oxides, whereby a core-shell structure of the catalyst body is created by obtaining a solution containing a zirconia sol and ceria sol followed by adjusting the pH to first generate an aggregate of one component followed by adjusting the pH further to generate an aggregate of the second component around the first component.

WO2005102524 (US2008051283) discloses a method of making ceria-zirconia catalyst bodies whereby the ratios of the cerium to zirconium on the surface layer and in the bulk of the catalyst are different. That difference is achieved by preparing a sol containing ceria-zirconia colloidal particles having different isoelectric points, followed by successively adjusting the isoelectric point to cause aggregation of ceria or zirconia resulting in a catalyst body with a core comprising of one metal oxide and the surface enriched in the other metal oxide. The present disclosure differs from WO2005102524 in that the present disclosure does not require pH adjustment, which can be expensive and cumbersome.

There have also been studies in which ceria-zirconia nanoparticles have been doped with La, Gd, or Pr (V. A. Sadykov, et al.; "Pt-supported nanocrystalline ceria-zirconia doped with La, Pr or Gd: factors controlling Syngas generation in partial oxidation/autothermal reforming of methane or oxygenates"; *Solid State Phenomena*, 128 (2007) 239-248). While these studies measured differences between the Ce:Zr atomic ratios of the surface as compared to the bulk, a systematic relationship between the type of rare-earth metal dopant and the Ce:Zr atomic ratio on the surface has not been established. The Ce:Zr ratios of the surface of nanoparticles in this prior studies do not follow a linear relationship in contrast to those reported in the present disclosure and as demonstrated in FIG. 2.

In embodiments, the present disclosure provides a catalyst body including, for example, ceria, zirconia, and a transition metal additive, such as tungsten oxide. The Ce:Zr ratio on the surface compared to bulk is systematically controlled through the addition of a rare earth metal dopant, such as $Y(NO_3)_3$, $Sm(NO_3)_3$, $La(NO_3)_3$, $Gd(NO_3)_3$, and like salts.

In embodiments, the disclosure provides methods for making the catalyst body. The catalyst body is especially useful in NOx reduction applications.

In embodiments, the disclosure provides a method of making a nanoparticle catalyst composition comprising:

a single heating of an aqueous salt solution comprising a Ce source, a Zr source, a rare earth dopant source, and a transition metal oxide source or precursor to provide for example in a dry state, nanoparticles, wherein the dry nanoparticles comprised of a $CeZrREO_2$ have a compositional gradient, where RE is a rare earth. The compositional gradient can comprise, for example, the outer portion of the nanoparticles having a Ce:Zr atomic ratio that is different from the inner portion of the nanoparticles.

In embodiments, the disclosed nanoparticles can be, for example, from 3 to about 10 nanometers, from 4 to about 8 nanometers, from 4 to about 6 nanometers, such as about 5 nm in diameter, and having little or no agglomeration. The disclosed nanoparticles compositional gradient or compositional structure can be, for example, where the surface composition is progressively different from the bulk. The surface can resemble a shell with a known average composition and the bulk can resemble a core with a different average composition. The compositional gradient differs from a conventional core-shell structure in that the there is no sharp compositional delineation between a core and shell. Instead there is a gradual transition or gradation of composition from the interior of the nanoparticle to the surface of the nanoparticle. For example, there can be a varying or continuous compositional difference in the relative amount or ratio of Ce to Zr from the core to the surface of the nanoparticle, for example as schematically illustrated in FIG. 1B.

In embodiments, the shell or surface of the nanoparticle can have, for example, a Ce:Zr ratio of from about 0.55 (i.e., for a zirconium enriched surface) to about 1.1 (i.e., for a cerium enriched surface).

In embodiments, the heating can be accomplished by any suitable method, for example, in a furnace, a microwave, and like energetic means, or a combination thereof, at for example, about 400° C. to about 600° C.

In embodiments, the rare earth dopant precursor or source can be, for example, at least one of $Y(NO_3)_3$, $Sm(NO_3)_3$, $La(NO_3)_3$, $Gd(NO_3)_3$, and like rare earth sources, or a mixture thereof. The transition metal salt precursor or source, can be, for example, ammonium meta-tungstate, and like transition metal sources, or a mixture thereof. In embodiments, the transition metal can be, for example, W.

In embodiments, the dry nanoparticles can have, for example, a surface area greater than about 90 $m^2$/gm, such as from about 90 to about 300 $m^2$/gm, about 90 to about 200 $m^2$/gm, about 100 to about 150 $m^2$/gm, 110 to about 140 $m^2$/gm, including intermediate values and ranges. In embodiments, the dry nanoparticles can be, for example, $CeO_2$—$ZrO_2$—$WO_3$, and like $CeZrREO_2$ combinations, or a mixture thereof.

In embodiments, the preparative method can further comprise, for example, integrating the resulting $CeZrREO_2$ catalyst into a support by, for example, washcoating the catalyst onto a support, extruding the catalyst in a green ware then firing the ware, or a combination thereof.

In embodiments, the disclosure provides a nanoparticle catalyst composition, comprising:

a nanoparticle having a compositional gradient structure comprised of a $CeZrREO_2$, where RE is a rare earth, and the outer portion of the nanoparticles has a Ce:Zr ratio different from the inner portion of the nanoparticles.

In embodiments, the outer portion of the nanoparticles can be, for example, enriched in Zr and the inner portion of the nanoparticles can be, for example, enriched in Ce. Conversely, in embodiments, the outer portion of the nanoparticles can be, for example, enriched in Ce and the inner portion of the nanoparticles can be, for example, enriched in Zr.

In an exemplary embodiment, for a 6 nm diameter nanoparticle, the top or outer 2 nm of the surface can have, for example, a Ce:Zr ratio of from about 0.55 to about 1.1, and the inner portion of the nanoparticle can have, for example, a Ce:Zr ratio of from about 6.5 to 0.9, respectively.

In embodiment, the disclosed nanoparticles can have, for example, an inner diameter thickness of about 1 to about 4 nanometers and an outer diameter thickness of about 1 to about 4 nanometers for nanoparticles having an overall diameter of from about 1 to about 10 nanometers, from about 2 to about 8 nanometers, from about 2 to about 7 nanometers, and like diameters, including intermediate values and ranges.

The disclosed nanoparticles and articles thereof, and the method of making are advantaged by at least one or more of the following:

In embodiments, the disclosed nanoparticles and articles thereof, and the method of making and use provide one or more advantageous features or aspects, including for example as discussed below. Features or aspects recited in any of the claims are generally applicable to all facets of the invention. Thus, any recited single or multiple feature or aspect in any one claim can be combined or permuted with any other recited feature or aspect in any other claim or claims.

An issue in the manufacture of multi-component catalyst bodies is that the elemental composition on the outer surface of the catalyst body can be substantially different from the elemental composition of the bulk of the catalyst body resulting in the use of complex manufacture controls, such as careful adjustment of the pH of the solution. The present disclosure provides a method of controlling the nanoparticulate surface composition relative to or compared with the bulk by the addition of different amounts and different types of dopants.

Figure 5:
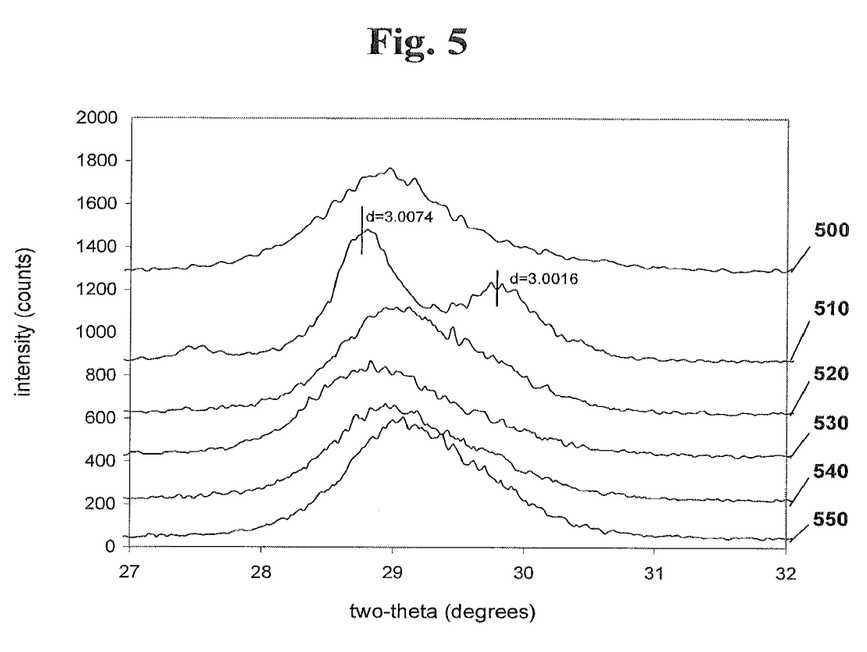
FIG. 5 shows X-ray diffraction results for inventive and comparative nanoparticles.

The addition of dopants can inhibit an undesirable outcome, i.e., without the addition of the dopants the heating of the catalyst to higher temperatures for extended times can result in segregation of the nanoparticles into two phases: one rich in $CeO_2$ and the other rich in $ZrO_2$ (see FIG. 5). The addition of a dopant can inhibit another outcome. Without the addition of the dopants, heating the catalyst to a higher temperature for extended times can result in the formation of an additional phase. The addition of the dopant inhibits the formation of that additional phase (see FIG. 6).

The enhanced control of the catalytic properties can reduce manufacturing cost, and the cost of incorporating the catalyst body into a formed body, in addition to improving the catalytic efficiency of the body.

In embodiments, the disclosure provides a mixed metal oxide nanoparticle having a gradient composition, and the composition comprises, consists essentially of, or consists of one of the nanoparticulate compositions as defined herein having a gradient.

In embodiments, the disclosure provides an article, and the article comprises, consists essentially of, or consists of one of a nanoparticulate composition having a gradient structure, as defined herein.

In embodiments, the disclosure provides a method of making a nanoparticulate composition having nanoparticles having a gradient structure, as defined herein.

These and other aspects of the disclosure are illustrated and demonstrated herein.

The catalytically active component in the extruded catalyst filter body can be, for example, any of the disclosed nanoparticulate mixed metal oxide particles, aggregates of nanoparticulates, or mixtures thereof. The extruded and fired catalyst filter body can be, for example, a nanoparticulate catalyst in an amount of about 20 to about 70 wt %, and an inorganic filler in an amount of about 80 to about 30 wt % based on 100 wt % of the total batch inorganic materials. In embodiments, the method can further comprise a pore former in from about 50 to about 90 wt % by superaddition relative to the total batch inorganic materials. In embodiments, the method can further comprise plugging a portion of the filter channels prior to firing the dried contacted filter body or after firing the dried filter body.

Figure 1A:
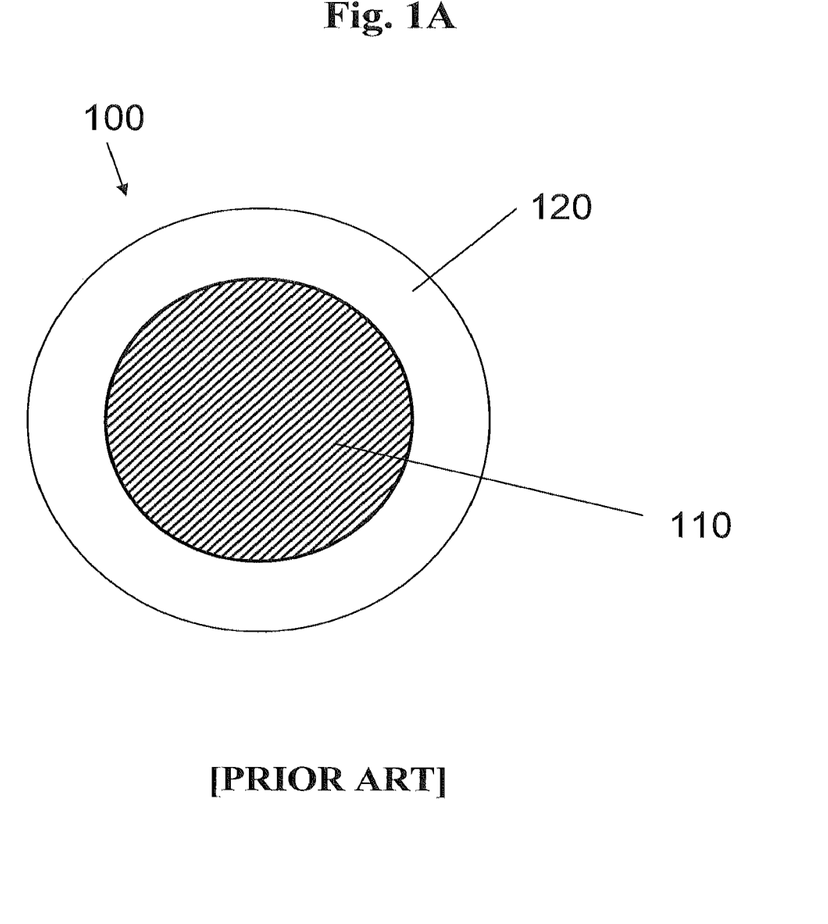
FIG. 1A shows a prior art nanoparticle having a core-shell structure.
Figure 1B:
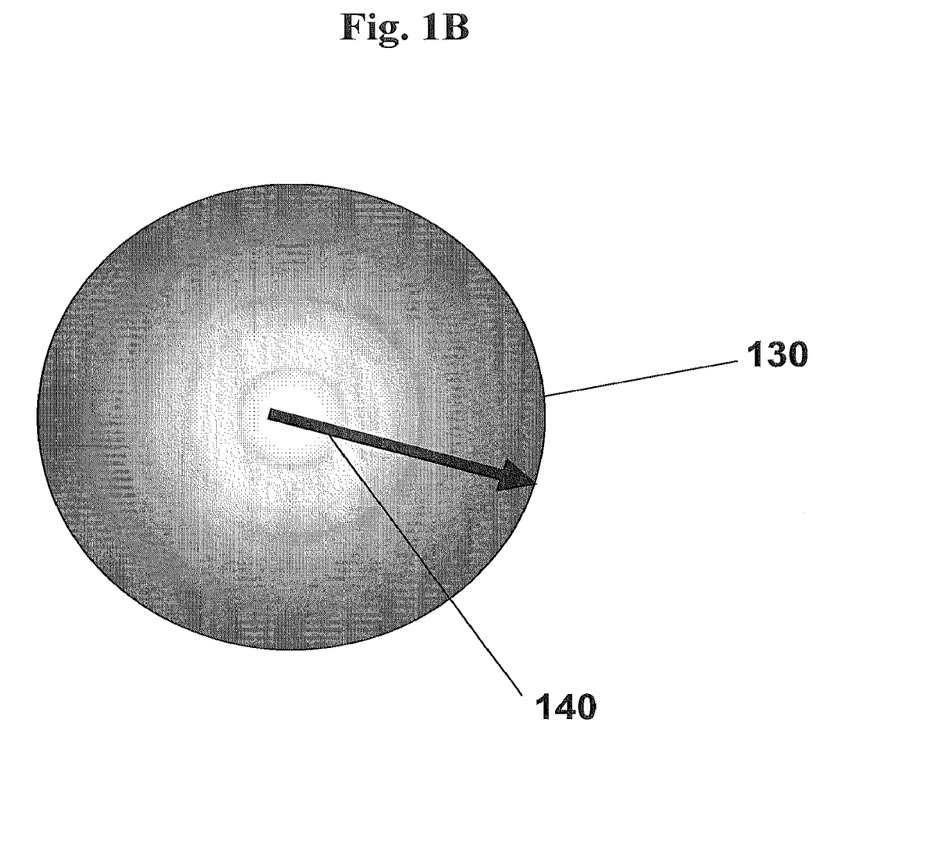
FIG. 1B schematically shows an exemplary mixed metal oxide nanoparticle of the disclosure having a gradient composition.

Referring to the figures, FIG. 1A shows a schematic of prior art nanoparticle having a core-shell structure having a core 110 and a shell 120, see for example, the aforementioned WO2005102524 (US2008051283).

FIG. 1B schematically shows the effect of addition of rare earth dopant (in an amount of about 20 atom %) on the composition of the high surface area $CeZrREO_2$ nanoparticle 130 where RE is a rare earth. In each instance the batching ratio of the composition was Ce:Zr:RE:W of 1:1:0.2:about 0.1 (in atomic ratios). X-ray photoelectron spectroscopy (XPS) results, which are extremely surface sensitive and report the composition of the top or outer most 1 to 2 nm of the nanoparticles, indicated the particle 130 had a surface that was depleted or enriched in Ce compared to the commensurately Ce enriched or depleted core. Since the synthesis method used in the disclosure (i.e., solution combustion synthesis) preserves the material balance (i.e., no material is lost due to evaporation or leaching), a low Ce:Zr ratio in the shell region and a higher Ce:Zr ratio in the core region suggests a Ce:Zr gradient 140 from the center of the particle 130 to the outer surface.

Figure 2:
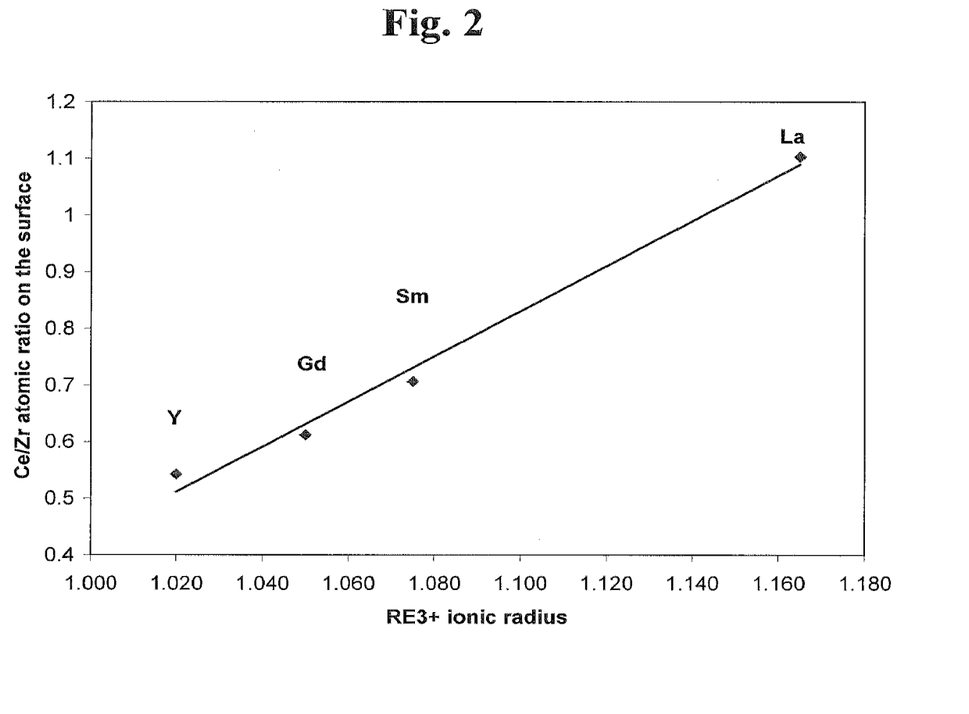
FIG. 2 shows examples of the elemental ratio (in atomic ratio) of cerium to zirconium for the surface of different nanoparticles in the CeREZrO$_2$—WO$_3$ system as measured by X-ray photoelectron spectroscopy (XPS).

FIG. 2 shows the elemental ratio (in atomic ratio) of cerium to zirconium for the surface of different nanoparticles systems in the $CeReZrO_2$—$WO_3$ as measured by X-ray photoelectron spectroscopy (XPS). Since XPS is extremely surface sensitive, the composition relates to the top surface the nanoparticles. All samples were made by solution combustion synthesis and the batching composition in each instance was Ce:Zr:RE:W 1:1:0.2:about 0.1 (in atomic) where the surface composition was depleted or enriched in Ce as a function of the type of dopant used.

Figure 3:
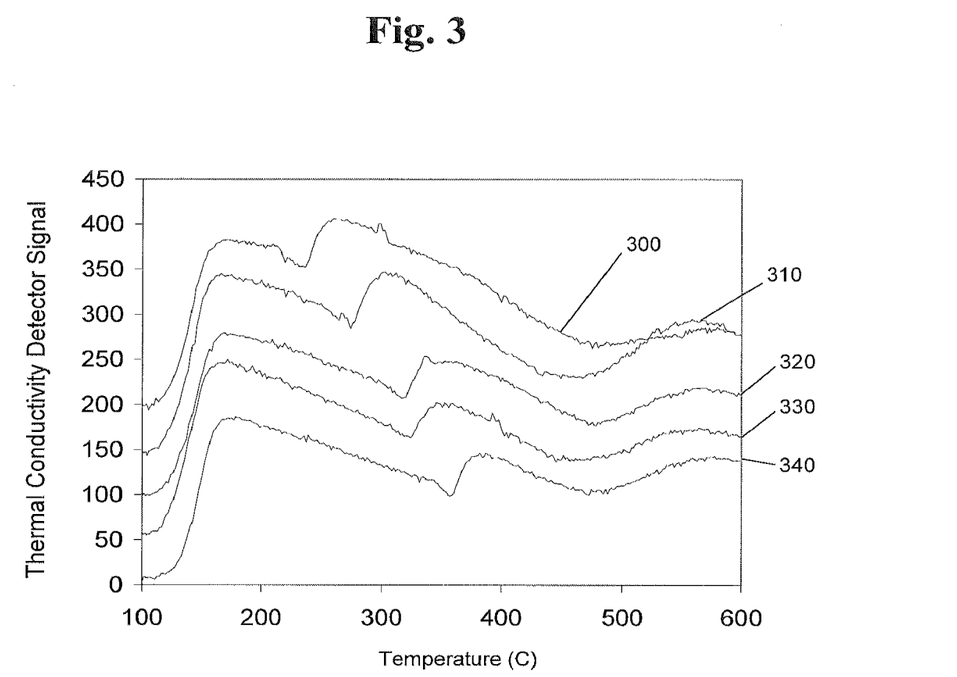
FIG. 3 shows the ammonia temperature-programmed desorption of different nanoparticle systems illustrating that the dopant can change ammonia desorption characteristics.

FIG. 3 shows the ammonia temperature-programmed desorption of different nanoparticle systems illustrating that the addition of the dopant can change ammonia desorption characteristics. In each instance the exposure to ammonia was accomplished under identical conditions. All samples contained the same amount of tungsten. Exemplary nanoparticle systems selected for desorption and illustrated in FIG. 3, include: undoped $CeZrO_2$—$WO_3$ 300; La doped $CeZrO_2$—$WO_3$ 310; Gd doped $CeZrO_2$—$WO_3$, 320; Sm doped $CeZrO_2$—$WO_3$, 330; Y doped $CeZrO_2$—$WO_3$, 340.

Figure 4:
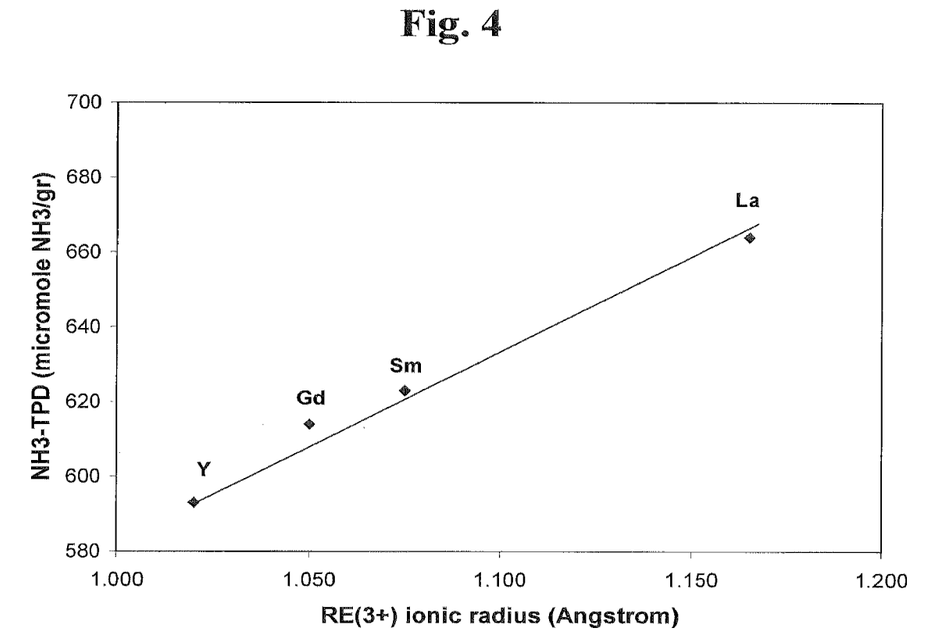
FIG. 4 shows total desorption of ammonia from ammonia temperature programmed desorption which illustrates that the dopant can affect the total ammonia adsorbed.

FIG. 4 shows total desorption of ammonia from ammonia temperature programmed desorption which illustrates that the type of dopant can affect the total ammonia adsorbed (captured) during the experiment. In each instance the ammonia exposure was accomplished under identical conditions.

FIG. 5 shows X-ray diffraction results for inventive and comparative nanoparticles, where trace 500 is $CeZrO_2$—$WO_3$ nanoparticles as received indicating little or no segregation; 510 is undoped $CeZrO_2$—$WO_3$ nanoparticles after calcining in air for 6 hours at 850° C. showing segregation of the un-doped $CeZrO_2$—$WO_3$ nanoparticles into ceria rich (d=3.0974 Å) and zirconia rich (d=3.0016 Å) phases; 520 is Gd doped $CeZrO_2$—$WO_3$ after calcining for 6 hours at 850° C. in air; 530 is La doped $CeZrO_2$—$WO_3$ after calcining for 6 hours at 850° C. in air; 540 is Sm doped $CeZrO_2$—$WO_3$ after 6 hours at 850° C. in air; and 550 is Y doped $CeZrO_2$—$WO_3$ nanoparticles after calcining in air for 6 hours at 850.

Figure 6:
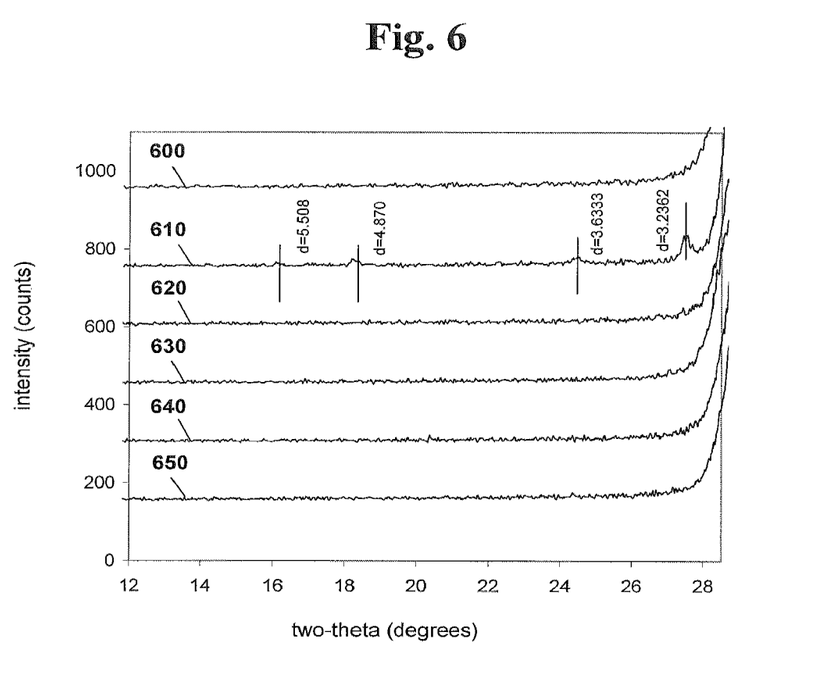
FIG. 6 shows X-ray diffraction results of the nanoparticles having an emphasis on a region of the diffraction pattern for cerium-tungstate.

FIG. 6 shows X-ray diffraction results of the nanoparticles with an emphasis on a region with the diffraction pattern for cerium-tungstate: 600 is $CeZrO_2$—$WO_3$ nanoparticles as received indicating no or little segregation; 610 is undoped $CeZrO_2$—$WO_3$ nanoparticles after calcining in air for 6 hours at 850° C. showing the formation of a second tungsten containing phase identified as $Ce_2(WO_4)_3$, with some of the atomic plane distances marked; 620 is Gd doped $CeZrO_2$—$WO_3$ after calcining for 6 hours at 850° C. in air; 630 is La doped $CeZrO_2$—$WO_3$ after calcining for 6 hours at 850° C. in air; 640 is Sm doped $CeZrO_2$—$WO_3$ after 6 hours at 850° C. in air; and 650 is Y doped $CeZrO_2$—$WO_3$ nanoparticles after calcining in air for 6 hours at 850° C.

EXAMPLES

The following examples serve to more fully describe the manner of using the above-described disclosure, as well as to set forth the best modes contemplated for carrying out various aspects of the disclosure. It is understood that these examples do not limit the scope of this disclosure, but rather are presented for illustrative purposes. The working examples further describe how to prepare the nanoparticles and articles having the nanoparticles of the disclosure. For additional definitions, descriptions, and methods metal oxide materials and methods, see for example, R. K. Iler, *The Chemistry of Silica*, Wiley-Interscience, 1979.

Example 1

Nanoparticulate Solution Combustion Synthesis

Precursor salts for Ce and Zr, such as $Ce(NO_3)_3$ and $ZrO(NO_3)_2$, respectively, were measured to produce separate equi-molar aqueous solutions of the Ce precursor and the Zr precursor.

Separately, solutions of nitrates of different dopant precursors, such as $Y(NO_3)_3$, $Sm(NO_3)_3$, $La(NO_3)_3$, and $Gd(NO_3)_3$ were prepared. All separate solutions were thoroughly mixed to effect complete dissolution of the dopant precursor salts. The solutions were then added to each other in such quantities that the total Ce:Zr:dopant ratio was 1:1:0.2 by atomic percent, mole percent, molar equivalent, or like equivalent metrics.

Separately, an aqueous solution containing a tungsten precursor, such as ammonium meta-tungstate, was prepared.

Separately, a solution of a fuel material, such as urea, was prepared and thoroughly mixed to effect complete dissolution of the fuel material.

One member from each of aforementioned individual solution categories, i.e., at least one of the Ce, Zr, rare earth dopant, W precursor solutions, and fuel, such as urea, or like fuel sources, were combined and mixed in a vessel and placed in a furnace and heated to about 400° C. to less than about 600° C. Within minutes after placing the vessels containing the solutions in the furnace, the solutions began to boil and subsequently fumed. After about 2 hours, the vessels were removed from the furnace. Each vessel contained a cake of loosely bound powder. The powders produced were characterized without further processing. Surface areas (BET) of the powders doped with $CeO_2$—$ZrO_2$—$WO_3$ were about 90 to about 100 $m^2/gm$.

Example 2

Prophetic

Predictive Method for Nanoparticulate Solution Combustion Synthesis—Nanoparticles Having Mixed Y and Gd Dopants FIG. 2 shows the surface Ce:Zr atomic ratio for nanoparticles containing Y as a dopant to be about 0.55 while the Ce:Zr ratio for nanoparticles containing Gd as a dopant to be about 0.61. To synthesize nanoparticles having a Ce:Zr ratio in intermediate ranges one can introduce a mixture of Gd and Y dopants according to the following procedure.

Precursor salts for Ce and Zr, such as $Ce(NO_3)_3$ and $ZrO(NO_3)_2$, respectively, are separately measured to produce equi-molar aqueous solutions of the Ce precursor and the Zr precursor.

Separately, solutions of nitrates of $Y(NO_3)_3$ and $Gd(NO_3)_3$ are prepared. All separate solutions should be thoroughly mixed to effect complete dissolution of the dopant precursor salts.

Separately, a solution of a fuel material, such as urea, was prepared and thoroughly mixed to ensure complete dissolution of the fuel material.

The solutions may then be added to each other in such quantities that the total Ce:Zr:Y:Gd ratio is, for example, 1:1:0.1:0.1, respectively, by atomic percent, mole percent, molar equivalent, or like equivalent metrics. The solution is then placed in a vessel and then into a furnace and heated to about 400° C. to about 600° C. Within minutes after placing the vessel containing the combined solution in the furnace, the solution should begin to boil and subsequently fume. After about 2 hours, the vessel is removed from the furnace. The vessel will contain a cake of loosely bound powder. Since in this example, the quantities of Y and Gd dopants are equivalent, the Ce:Zr ratio of the final nanoparticles should be, for example, (0.61+0.55)/2 or 0.58.

Example 3

Prophetic

Predictive Method for Nanoparticulate Solution Combustion Synthesis—Nanoparticles Having Sm:La Dopants To obtain a Ce:Zr surface ratio of 0.9 one can use Sm and La as dopants according to the following procedure.

Precursor salts for Ce and Zr, such as $Ce(NO_3)_3$ and $ZrO(NO_3)_2$, respectively, are measured to produce separate equi-molar aqueous solutions of the Ce precursor and the Zr precursor.

Separately, solutions of nitrates of $La(NO_3)_3$ and $Sm(NO_3)_3$ are prepared. All separate solutions are thoroughly mixed to effect complete dissolution of the dopant precursor salts.

Separately, a solution of a fuel material, such as urea, was prepared and thoroughly mixed to ensure complete dissolution of the fuel material.

The solutions are then added to each other in such quantities that the total Ce:Zr:Sm:La ratio is, for example, 1:1:0.1:0.1 by atomic percent, mole percent, molar equivalent, or like equivalent metrics. The solution is then placed in a vessel and then placed in a furnace and heated to about 400° C. to about 600° C. Within minutes after placing the vessels in the furnace, the solutions should begin to boil and subsequently fume. After about 2 hours, the vessels are removed from the furnace. Each vessel will contain a cake of loosely bound powder. The Ce:Zr ratio of the surface of the resulting nanoparticles should be about 0.9.

The addition of rare earth metal dopants of different ionic radii has the effect of changing the Ce:Zr atomic ratio on the surface of the nanoparticles, as measured by XPS, compared to the bulk of the nanoparticles, which ratio is set according to the batch composition ratio. An example of the extent of this change for nanoparticles whose batch atomic ratio composition of Ce:Zr:RE:W is, for example, 1:1:0.2:about 0.1, is shown in FIG. 3. In those examples, XPS results show the surface composition ranges linearly, for the rare earths shown, from Ce:Zr of 0.6, for addition of Y, to Ce:Zr of 1.1, for the addition of La. Since XPS measures the composition of the top 1 to 2 nm of the surface of the nanoparticle, and the preparative method does not result in loss (e.g., through evaporation) of any of the Ce, Zr, RE or W constituents, and the Ce:Zr atomic ratio was set to 1:1, depletion of Ce on the surface implies enrichment of Ce deeper into the bulk of the nanoparticles. The linear change for the examples in FIG. 3 is a surface Ce:Zr ratio of $3.98 \times (Re^{3+}$ radius$) - 3.55$.

For different catalytic performance applications, it is sometimes necessary to set the surface composition of the ceria-zirconia nanoparticles to a known value. Using the linear relationship presented in FIG. 3 for the Ce:Zr of 1:1 atomic ratio and similar relationships obtained for different Ce:Zr atomic ratios, it is possible to select a rare earth dopant to produce ceria-zirconia nanoparticles (with or without tungsten additive) of a desired Ce:Zr composition on its surface.

Additionally, it is possible to produce combinations of different rare-earth dopants and add them to the solution combustion synthesis batch (such as La and Sm) to produce a weighted effect of rare earth dopants on the composition of the surface.

FIG. 3 shows ammonia temperature-programmed-desorption features changing as a function of the rare-earth metal dopant. A desorption event which occurs at approximately 260° C. for the undoped $CeO_2$—$ZrO_2$—$WO_3$ shifts to higher temperature as a function of rare-earth dopant type (e.g., 390° C. for the addition of yttrium). This behavior, where the desorption temperature of a substantial portion of the adsorbed ammonia can be systematically changed has applications, for example, in designing ammonia sensors or catalysis.

Additional or Alternative Utilities

The disclosed catalyst article and methods of making and using can be applied to control the sensitivity of the catalyst to function as an ammonia sensor. The catalyst is acidic in nature and can capture ammonia on it surface if it is exposed to an ammonia source. By establishing the linear relationship demonstrated in the temperature programmed desorption (TPD) of micromole ammonia capture over the various rare earth dopants, one can use this relationship to design a sensor with broad sensitivity for detecting the ammonia content or exposure level (see for example, Satsuma, et al., "Tungstated-Zirconia Thick Film Electrode as Ammonia Sensor for Urea-SCR," The 14th International Congress on Catalysis.)

Another application of the disclosed catalyst article and methods of making and using is for reducing ammonia ($NH_3$) oxidation due to reduced Ce surface concentration. Since the method of making can provide a means to reduce the Ce on the catalyst surface, one can use the method to retard ammonia oxidation. Since Ce is a known ammonia oxidation catalyst at high temperature, one can use such a Ce gradient to retard ammonia oxidation on the surface.

Yet another application of the disclosed catalyst article and methods of making and use is to mimic the performance of a layered catalyst system while avoiding the expense and difficulty in preparing a layered catalyst system. Catalyst layering is an established technology in catalysis. For example, in light-off, mass transfer is fast, so the light-off catalyst is laid down first. At steady state, mass transfer is controlling, so the outer catalyst is for steady state. Instead of the forming two catalyst layers which would require two application steps, the disclosed method can be used to prepare a core-shell equivalent or comparable that can be applied as a single washcoat or extruded to form a honeycomb body.

The disclosure has been described with reference to various specific embodiments and techniques. However, it should be understood that many variations and modifications are possible while remaining within the scope of the disclosure.

What is claimed is:

1. A method of making a nanoparticle catalyst composition comprising:
   a single heating of an aqueous salt solution comprising a Ce source, a Zr source, a rare earth dopant source, and a transition metal oxide source to provide nanoparticles comprised of Ce, Zr, RE, and TM, where RE is a rare earth, TM is a transition metal, and the nanoparticles have a compositional gradient comprising an outer portion of the nanoparticle having a Ce:Zr atomic ratio different from the inner portion of the nanoparticle.

2. The method of claim 1 wherein the outer portion of the nanoparticle has a Ce:Zr ratio of from about 0.55 to about 1.1.

3. The method of claim 1 wherein the heating is accomplished in a furnace, in a microwave, with irradiation, or a combination thereof, at about 400° C. to about 600° C.

4. The method of claim 1 wherein the rare earth dopant source comprises at least one of $Y(NO_3)_3$, $Sm(NO_3)_3$, $La(NO_3)_3$, $Gd(NO_3)_3$, or a mixture thereof.

5. The method of claim 1 wherein the transition metal oxide source comprises ammonium meta-tungstate.

6. The method of claim 1 wherein after the heating the nanoparticles are dried and have a surface area greater than about 90 $m^2/gm$.

7. The method of claim 1 wherein the transition metal oxide source includes tungsten (W).

8. The method of claim 1 wherein the nanoparticle catalyst composition comprises nanoparticles of the formula $CeO_2$—$ZrO_2$—$WO_3$ and a rare earth dopant.

9. The method of claim 1 further comprising integrating the nanoparticle catalyst composition into a support including: washcoating the nanoparticle catalyst composition onto a support, extruding the catalyst in a green ware then firing the ware, or a combination thereof.

10. A nanoparticle catalyst composition comprising:
    a nanoparticle having a compositional gradient comprised of a $CeZrREO_2$, where RE is a rare earth, and the compositional gradient comprises an outer portion of the nanoparticle having a Ce:Zr atomic ratio different from the inner portion of the nanoparticle.

11. The composition of claim 10, wherein the outer portion of the nanoparticles is enriched in Zr and the inner portion of the nanoparticles is enriched in Ce, or the outer portion of the nanoparticles is enriched in Ce and the inner portion of the nanoparticles is enriched in Zr.

12. The composition of claim 10, wherein the nanoparticle has a diameter of about 6 nm, the top 2 nm of the surface of the nanoparticle has a Ce:Zr ratio of from about 0.55 to about 1.1, and the inner portion of the nanoparticle has a Ce:Zr ratio of from about 6.5 to 0.9, respectively.

13. The composition of claim 10, wherein the rare earth is selected from the group consisting of $Y(NO_3)_3$, $Sm(NO_3)_3$, $La(NO_3)_3$, $Gd(NO_3)_3$, and combinations thereof.

14. The composition of claim 10, wherein the nanoparticle has a diameter of from about 3 to about 10 nanometers having an inner diameter of about 1 to about 4 nanometers and an outer diameter of about 1 to about 4 nanometers.

15. A nanoparticle composition comprising: Ce, Zr, and optionally a rare earth, the nanoparticle having a compositional gradient comprised of an outer portion having a Ce:Zr atomic ratio different from the inner portion of the nanoparticle.

16. The composition of claim 15, wherein the optional rare earth is selected from the group consisting of Y, Sm, La, Gd, and combinations thereof.

* * * * *